May 4, 1937.  H. OKURA  2,079,464
HYPERBOLIC SCALE RULE
Filed March 20, 1933
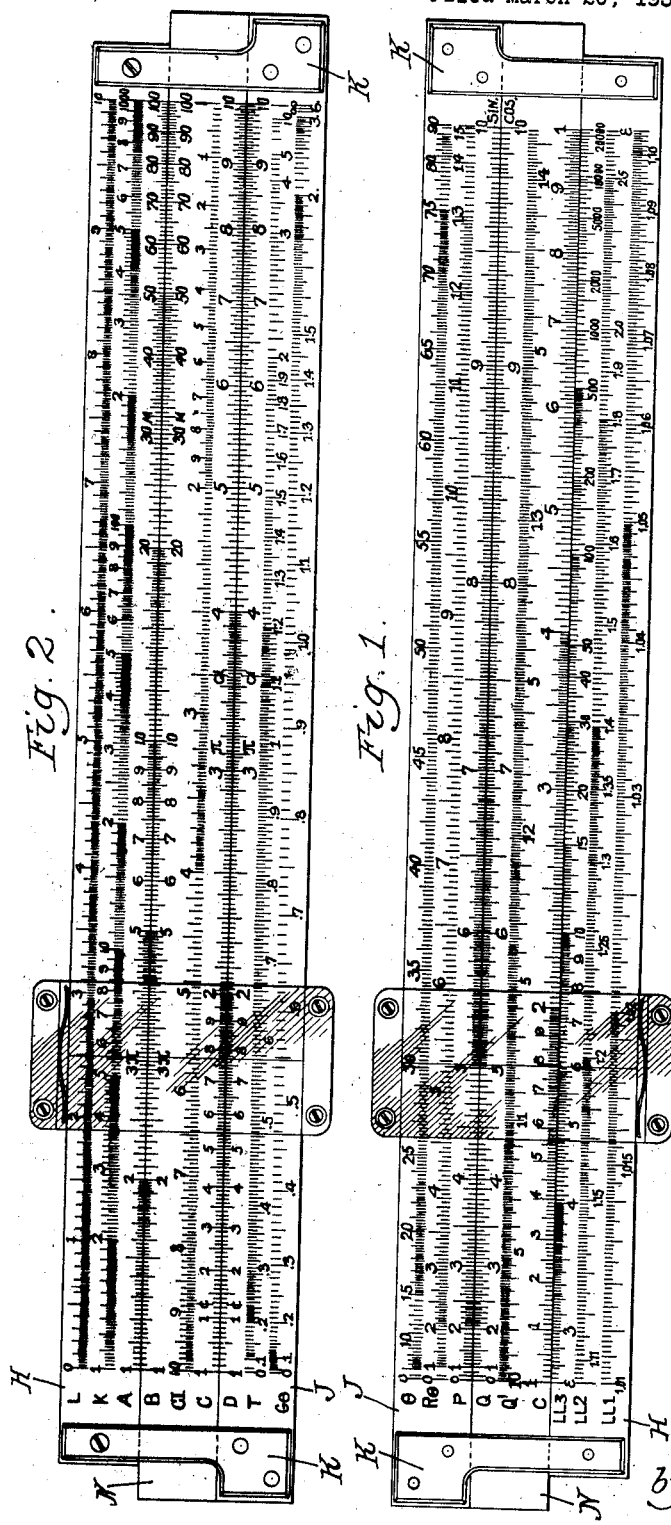
Inventor
Hisashi Okura
by Parker + Carter
Attorneys.

Patented May 4, 1937

2,079,464

UNITED STATES PATENT OFFICE 2,079,464

HYPERBOLIC SCALE RULE

Hisashi Okura, Tokyo, Japan, assignor to The Hemmi Seisakusho Co., Tokyo, Japan

Application March 20, 1933, Serial No. 661,743
In Japan January 14, 1932

2 Claims. (Cl. 235—70)

This invention relates to a slide rule and particularly to a hyperbolic slide rule. In any slide rule now known, the scales for hyperbolic functions are invariably to work in compliance with logarithmic scales. In such old slide rule, it is required to provide three logarithmic hyperbolic scales for reading three hyperbolic functions, that is, a logarithmic hyperbolic sine scale for hyperbolic sine, a logarithmic hyperbolic cosine scale for hyperbolic cosine and a logarithmic hyperbolic tangent scale for hyperbolic tangent. In the log-log Vector slide rule, for instance, there are provided a logarithmic hyperbolic sine scale and a logarithmic hyperbolic tangent scale, the value of hyperbolic secant being calculated from the readings of the hyperbolic tangent and the hyperbolic sine.

The principal object of this invention is to provide a slide rule having a single additional scale whereby all six hyperbolic functions may be read on the slide rule by virtue of the single additional scale. Other objects of the invention will appear from time to time throughout the specification and claims.

This invention is illustrated more or less diagrammatically in the accompanying drawing, wherein—

Figure 1 is a front plan view of the scale;
Figure 2 is a rear plan view of the scale.

Like parts are indicated by like characters throughout the specification and drawing.

In the slide rule there are fixed bars J and H secured together on both ends by plates K with adequate space between them, and in which a sliding bar N is inserted between the fixed bars so as to slide longitudinally along the fixed bars.

The three scales on the back of the fixed bar H designated L, K, and A respectively, as shown in Figure 2, are the same scales as those used on ordinary polyphase slide rules. The three scales on the back of the sliding bar N designated B, CI and C are also the same scales as those used on ordinary polyphase slide rules. That is; L, the equidivision scale, has the whole length divided decimally into 500 equal parts so that the least one space is one five-hundredth part of the whole length of the scale. K is the logarithmic scale containing three units in the whole length of the scale L, and A and B are the logarithmic scales containing two units in the whole length of the scale L. C is the logarithmic scale containing only one unit in the whole length of the scale L. CI is calibrated in a logarithmic scale similar to C, but in the reverse direction thereto.

There are three scales ($\Theta$), ($R\theta$) and (P) on the front face of the fixed bar J, shown in Fig. 1, which are, respectively, as follows:—

($\Theta$), a non-logarithmic scale of angles, the angle being in degrees and decimals, and the whole scale is for the range of 0.0–90°. This scale is calibrated by the equation $$\Theta° = \sin^{-1}\sqrt{x}$$

along the scale L, where $x$ is the reading of the corresponding point on the scale L. In the description hereinbelow "$x$" has the same meaning as above mentioned. ($R\theta$), a non-logarithmic scale of angle, the angle being in the circular measure or in radian, and the whole scale is for the range of $$0.0 - \frac{\pi}{2}$$

This scale is calibrated along the scale L by the equation $$\Theta = \sin^{-1}\sqrt{x}$$

in radian.

(P), a non-logarithmic scale, this is, a square root scale, which is for the range of 0.0–1.0. The equation defining the scale P is $$p = \sqrt{x}$$

where $p$ is the reading on the scale P. This scale is also graduated taking the scale L as its standard.

There are three scales, (Q), (Q') and (C) on the front face of the sliding bar, N, shown in Fig. 1, which are respectively as follows:—

(Q), is exactly the same as (P).
(Q'), is an extension of (Q), from 1.0 to 1.414 which is the square root of 2.
(C), the common scale on the ordinary slide rule, a logarithmic scale of one unit.

There are three scales, (LL1), (LL2), and (LL3) on the front face of the fixed bar, H, shown in Fig. 1, which are the same scales as the log-log scales that are found on the log-log duplex slide rule.

There are three scales on the back of the fixed bar J designated (D), (T), (Gθ) which are the scales mentioned below, (D), equal with said (C) scale;

(T), a non-logarithmic tangent scale, graduated from 0.0 to infinity, by the equation $t=\tan\theta$, where θ is the reading of the point on the scale Rθ corresponding to the reading $t$ on the scale T. This scale is derived from the scale Rθ.

(Gθ), is the Gudermanian scale which characterizes the present invention. This scale is graduated by the equation $$u=\tanh^{-1}\sqrt{x}$$

or $u=\log(\tan\theta+\sec\theta)$, where $u$ and θ represent the readings of the corresponding points on the scales Gθ and Rθ respectively, the Gudermanian scale being derived from the scale L or Rθ.

The slide rule of this invention is of the duplex type. It has eighteen scales in all on it. Among these scales, the following seven scales are particularly important: the equidivision scale L, the square root scales P, Q and Q', the radian scale Rθ, the tangent scale T and the Gudermanian scale Gθ.

Now, I will explain the particular advantages of this slide rule. Put the hair line on $u$ on the scale Gθ and let $x$ be the reading on the scale L coming under the hair line. Then $x$ will be $\tanh^2 u$, because $x=\sin^2\theta=\sin^2(gdu)$, and $\sin(gdu)=\tanh u$ by the Gudermanian theorem.

*Examples.*—Against $u=0.5$, $u=1.0$, $u=2.0$ etc. on (Gθ) there are respectively $\tanh^2(0.5)=0.2135$, $\tanh^2(1.0)=0.5800$, $\tanh^2(2.0)=0.9305$, etc. on (L). The scale of this invention is thus entirely different from any scale on the Mannheim slide rule; I will explain the relationship between the various scales on the present slide rule mathematically. As above mentioned, $u=\log(\tan\theta+\sec\theta)$.

Now from this formula can be derived $$\epsilon^u=\tan\theta+\sec\theta=\frac{\sin\theta+1}{\cos\theta}$$

where $\epsilon$ is the base of Napierian logarithms.

Hence $$\epsilon^{2u}=\frac{(\sin\theta+1)^2}{1-\sin^2\theta}=\frac{1+\sin\theta}{1-\sin\theta}$$

or $$\sin\theta=\frac{\epsilon^{2u}-1}{\epsilon^{2u}+1}$$

But by one of the formulae for hyperbolic functions $$\frac{\epsilon^{2u}-1}{\epsilon^{2u}+1}=\tanh u$$

Hence $\sin\theta=\tanh u$ which relation is the most essential basis for this invention. Now let $\theta=gd\,u$, then $\sin(gdu)=\tanh u$ If the hairline be set at $x$, on (L), and read θ, $u$, $p$ and $t$ respectively on (Rθ), (Gθ), (P) and (T) under the hairline; then the result is:

$$p=\sqrt{x},\text{ or }p^2=x$$

$$\theta=\sin^{-1}\sqrt{x}\text{ or }\sin^2\theta=p^2=x$$

$$\text{or }p=\sin\theta$$

$$t=\tan(\sin^{-1}\sqrt{x})=\tan\theta$$

$$x=\tanh^2 u\text{ or }\tanh u=\sqrt{x}=p=\sin\theta$$

Thus, if the hairline be set at a reading $p$ on (P), then $p$ itself is $\tanh u$ or the hyperbolic tangent of $u$, where $u$ is the very reading on (Gθ) under the hairline.

Again as has already been stated, the value of $p$ is the sine of θ, or $p=\sin\theta$, θ being the reading on (Rθ) under the hairline; and θ on (Rθ) is equal to the Gudermanian of $u$, or $\theta=gdu$, $u$ being the reading on (Gθ) under the hairline. But by the formulae we have obtained.

$$t=\frac{\sin\theta}{\cos\theta}=\sqrt{\frac{\sin^2\theta}{1-\sin^2\theta}}=\sqrt{\frac{\tanh^2 u}{1-\tanh^2 u}}=$$

$$\sqrt{\frac{\frac{\sinh^2 u}{\cosh^2 u}}{\frac{\cosh^2 u-\sinh^2 u}{\cosh^2 u}}}=\sqrt{\frac{\sinh^2 u}{\cosh^2 u-\sinh^2 u}}$$

Now by one of the well-known formulae for hyperbolic functions:—

$$\cosh^2 u=1+\sinh^2 u$$

or $$\cosh^2 u-\sinh^2 u=1$$

Hence $$t=\sqrt{\frac{\sinh^2 u}{1}}=\sinh u$$

So the value of $t$ on (T) found for $u$ on (Gθ), is equal to the value of the hyperbolic sine of $u$, or to $\sinh u$. Next, if the left end of (Q) be set to $u$ on (Gθ), and the reading of the point on (Q) against the right end of (P) is $y$, then by the natures of (P) and (Q) we shall have $$\tanh^2 u+y^2=1$$

or $$y=\sqrt{1-\tanh^2 u}=\text{sech}\,u$$

So it will be seen that one can have sech $u$ on (Q) against the right end of (P) when the left end of (Q) is set to $u$ on (Gθ). Also by the formulae of hyperbolic functions:—

$$\text{cosech}\,u=\frac{1}{\sinh u}$$

$$\coth u=\frac{1}{\tanh u}$$

$$\cosh u=\frac{1}{\text{sech}\,u}$$

Thus it is clear that when one has $\sinh u$, $\tanh u$, and sech $u$, he could very easily have the other three functions cosech $u$, coth $u$ and cosh $u$ by simply taking the reciprocals of the former on (CI).

Thus one can have all the six classes of hyperbolic functions by the addition of a single scale (Gθ) to an existing slide rule.

EXAMPLES OF CALCULATION

(a) *sinh u*

Set the hairline at the given value of $u$ on (Gθ) and one can read $\sinh u$ on (T) under the hairline.

*Example 1.*—$\sinh 0.32=0.325$.

Put the hairline at 0.32 on (Gθ) and read 0.325 on (T) under the hairline.

(b) *tanh u*

Set the hairline at the given value of $u$ on (Gθ) and one can read $\tanh u$ on (P) under the hairline.

*Example 2.*—$\tanh 0.83=0.681$.

Put the hairline at 0.83 on (Gθ) and read 0.681 on (P) under the hairline.

(c) *sech u*

By the help of the hairline, set the left end or 0 of (Q) to the given value of $u$ on (Gθ) and one can read sech $u$ on (Q) against the right end or 1.0 of (P).

*Example 3.*—sech 0.55=0.866.

Put the hairline at 0.55 on (G$\theta$), set the left end or 0 of (Q) to the hairline, and read 0.866 on (Q) against the right end or 1.0 of (P).

(d) cosh $u$

Reverse sech $u$ by the help of the hairline on (CI).

*Example 4.*—cosh 0.55=1.154.

Put the hairline at 0.868 on (C) and read 1.154 on (CI) under the hairline.

(e) coth $u$

Reverse tanh $u$ by the help of the hairline on (CI).

*Example 5.*—coth 0.83=1.468.

Put the hairline at 0.681 on (C) and read 1.468 on (CI) under the hairline.

(f) cosech $u$

Reverse sinh $u$ by the help of the hairline on (CI).

*Example 6.*—cosech 0.32=3.08.

Put the hairline at 0.325 on (C) and read 3.08 on (CI) under the hairline.

Thus according to the present slide rule, all six classes of hyperbolic functions of any number or augment $u$ may be read directly by putting the hairline on $u$, which represents the number in question, on the scale G$\theta$.

I claim:

1. A slide rule comprising two parallel fixed bars secured together on both ends with space therebetween and a bar slidably inserted into the space between the said fixed bars, one fixed bar having a square root scale on its front face and a Gudermanian scale, a tangent scale and a logarithmic scale on its back face, and the sliding bar having a square root scale and a logarithmic scale on its front face and a reversed logarithmic scale on its back face, and the other fixed bar having an equidivision scale on its back face, all of the said scales being calibrated along the length of the bar taking the equidivision scale as the standard scale.

2. A slide rule comprising two fixed parallel bars secured together with space therebetween and a sliding bar slidably inserted into the space between the said fixed bars, one fixed bar having an angle scale in degree, a radian angle scale and a square root scale on its front face, and a one unit logarithmic scale, a tangent scale and a Gudermanian scale on its back face, and the sliding bar having two square root scales and a one unit logarithmic scale on its front face and a two unit logarithmic scale, a reversed logarithmic scale and a one unit logarithmic scale on its back face, the second fixed bar having three log-log scales on its front face and an equidivision scale, a three unit logarithmic scale, a square scale and a two unit logarithmic scale on its back face, all of the said scales being calibrated along the length of the bar taking the equidivision scale as the standard scale.

H. OKURA.